Sept. 1, 1953  DE WITT C. CLINTSMAN  2,650,507
DIFFERENTIAL RESISTOR
Filed Aug. 7, 1952
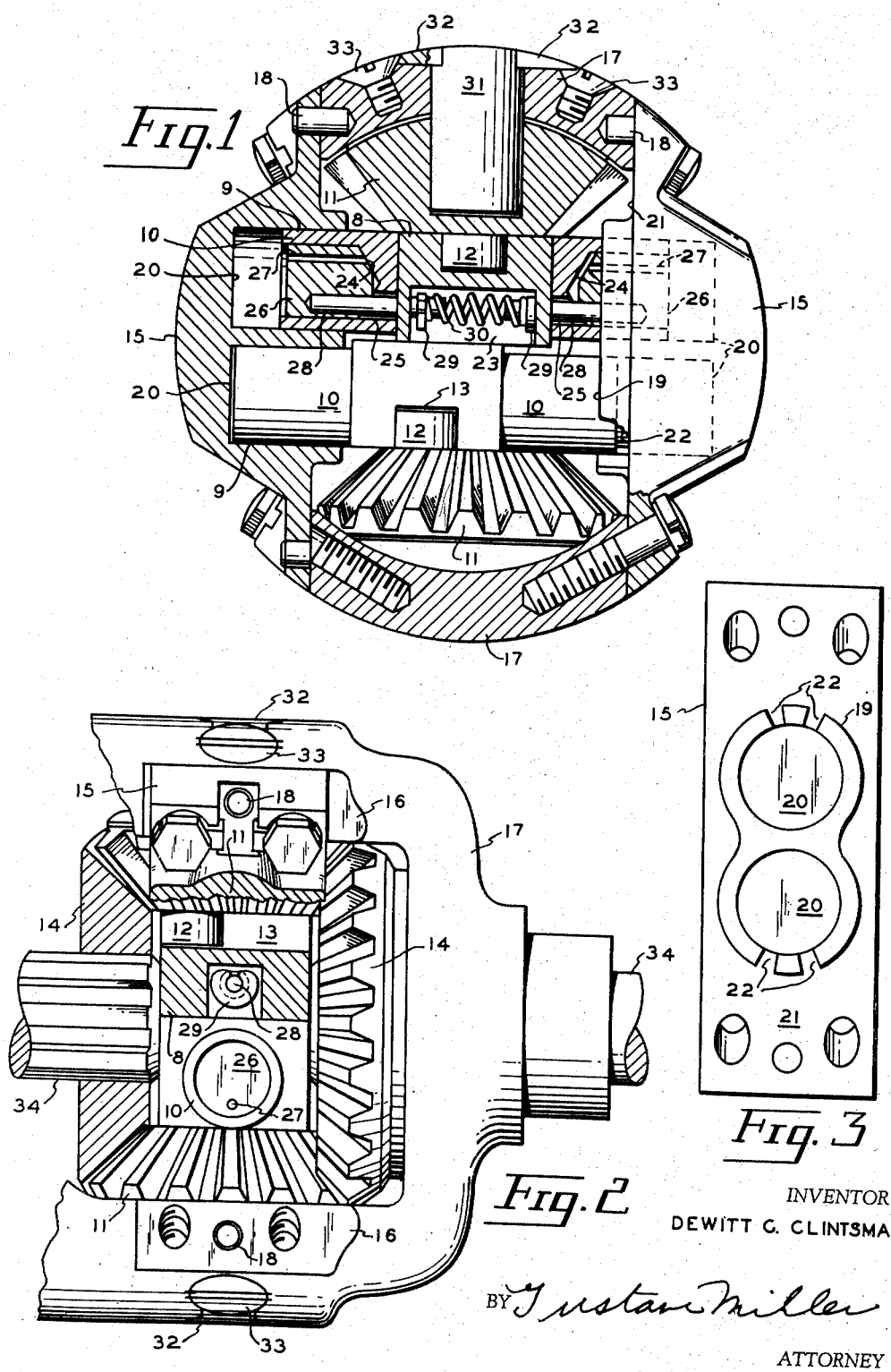
INVENTOR
DEWITT C. CLINTSMAN
BY *Gustav Miller*
ATTORNEY Patented Sept. 1, 1953

2,650,507

UNITED STATES PATENT OFFICE 2,650,507

DIFFERENTIAL RESISTOR

De Witt C. Clintsman, Watertown, N. Y.

Application August 7, 1952, Serial No. 303,120

5 Claims. (Cl. 74—711)

This invention relates to a differential resistor.

Much effort has been directed toward remedying a troublesome feature in the natural action of differential gearing as applied to the driving axles of automotive vehicles.

It is a characteristic of differential gearing that driving power is divided always equally between the two side gears regardless of any greatly varying difference in the tractive resistance of the two wheels. It is impossible to apply any more power to the wheel that has good traction than it takes to turn the wheel that has poor traction.

The side gears are driven by the planetary movement of the pinion gears so when the side gears are driven at equal speeds with the vehicle moving in a straight line, the pinion gears are rotatively motionless on their own axes. When the vehicle turns from a straight line, the speeds of the side gears differ as the arcs of the wheels differ and the pinion gears are correspondingly rotated between them while still applying equal power to the two side gears. This action is the sole object in the employment of differential gearing and must not be departed from. However, the fault that is inherent in this action is the inability to prevent a greater difference in the speeds of the side gears than occurs when making a normal turn as when one wheel spins from lack of traction while the other remains stationary with good traction. When this occurs, the combined planetary and rotary movements of the pinion gears drive the one side gear at doubled speed which not only further lessens that wheel's tractibility but often digs itself down far below its original tractive surface.

Many various ideas have been submitted for overcoming this trouble and some have been tried with also varying degrees of success. Some of these objects have been to directly prevent any great difference in the speeds of the side gears. In that case, any corresponding reduction in the rotary motion of the pinion gears is merely a meaningless result. According to the best information, in all cases where this method is used, the entire power is applied to the slower turning wheel even when making a normal turn, while the other wheel overruns it by its own traction. This is a departure from the desired normal differential action.

It is an object of the other method to directly resist any rapid rotary motion of the pinion gears and thereby prevent any great difference in the speeds of the side gears. Since the pinion gears drive the side gears, this seems like the more practical approach to the problem. However, this necessitates some important considerations both operational and constructional. Operationally, slow rotary motion of the pinion gears should be allowed unresisted with resistance increasing rapidly with any increasing rotary speed. Constructionally, moving parts must occupy that rectangular space between the four gears which is conventionally filled by the long pinion shaft through both sides of the carrier, both pinion gears and an axle thrust block if one is used. And this must be done without sacrificing the solid thrust, the pinion gear spacing or the strength and rigidity of the pinion shaft. Also, it should be done without departing from the conventional carrier, bearing and gearing construction.

All these objects are satisfied in this present invention. Although the conventionally used parts are necessarily shown in the accompanying drawings, this invention relates only to those parts and their construction and arrangement which are added or altered for the purpose of resisting the rotary motion of the pinion gears.

With the foregoing and other objects in view, this invention comprises the combination, construction, and arrangement of parts hereinafter set forth, claimed and disclosed in the accompanying drawings, wherein:

Fig. 1 is an end view of the differential resistor assembly but omitting the side gears;

Fig. 2 is a side view of Fig. 1 showing the side gears;

Fig. 3 is a view of the inside face of a cylinder block.

There is shown in Fig. 1 two identical double-end pistons 10 filling the space between the pinion gears 11. Referring to the lower piston, which is at the left end of its stroke, it will be seen that each end of the piston is cylindrical at 9 for a distance slightly greater than the length of its stroke. The central portion integrally connects the cylindrical end and is rectangular in shape at 8, with its width correct for spacing between the axle shafts 34 as shown in Fig. 2.

Cylindrical projections 12 eccentrically positioned on the inner face of the pinion gears 11 engage channels 13 milled across the center of the pistons 10. Thus as the pinion gears 11 are rotated by different speeds of the two side gears 14, the pistons 10 are reciprocated. In assembling, the pinion gears 11 are so placed that the eccentric projections 12 are at a 90 degree angle to each other, thus overlapping the piston strokes one half.

Two cylinder blocks 15 are bolted to milled surfaces 16 on the sides of the carrier 17. These cylinder blocks 15 are accurately located by dowel pins 18 to correctly position the pistons 10. A boss 19 completely surrounding the cylinder bores 20 extends inwardly from the face 21 of the cylinder blocks 15. Four slots 22, two at each diametric opposite of the two cylinders 20, are milled through the boss 19 to a depth flush with the face 21 of the block 15. When a piston 10 is withdrawn from a cylinder 20 to the limit of its stroke, its outer end 9 passes outward slightly beyond the face 21 of the block 15, completely relieving the vacuum through the slots 22 as shown at the lower right end of the lower piston in Fig. 1. Although the piston 10 is withdrawn past the face 21 of the block 15, it is still well within the boss 19 to retain rigidity against axle thrust.

Two short pinion gear shafts 31 replace the conventional long shaft. To restore the rigidity that is lost by not having both ends supported, the outer end has lateral projections 32 forming a T which fits into a channel milled across the carrier 17. The outer ends of the T 32 are secured rigidly by screws 33 with countersunk heads which fit a corresponding shape in the ends of the T.

The changing resisting action can be seen with almost exclusive reference to the upper piston 10 in Fig. 1. This piston 10 is shown in cross section through the center of the cylindrical ends 9 and somewhat off center through the rectangular portion 8. A rectangular cavity 23 somewhat shorter than the rectangular portion 8 of the piston 10 is made in the center of the inner face of the rectangular portion 8 of the piston 10. A large hole is bored deeply into each end 9 of piston 10 with the bottom formed into an angular seat 24. A comparatively small hole 25 is drilled from the inner side of the bottom of the large hole on through into the end of cavity 23. A plunger 26 precisely fitting the large hole and is seat 24 is inserted in the large hole. A very small bleed hole 27 is drilled through the entire length of plunger 26 midway between the center and outside of its seat 24. Diametrically opposite hole 27, pin 28 is pressed into a hole in the inner end of plunger 26. Pin 28 is somewhat smaller than hole 25 and extends through that hole for some distance into cavity 23. A small groove is cut around pin 28 near its end and a horseshoe spring washer 29 is forced onto the pin in this groove. The distance from washer 29 to the outer end of plunger 26 is the same as from the end of cavity 23 to the end of the piston 10. But plunger 26 is slightly shorter than its hole in the piston. Therefore, when washer 29 is against the end wall of cavity 23, the end of plunger 26 is flush with the end of piston 10 and the seats 24 are slightly apart as shown at the right hand end 9 of the piston 10. Turning to the left hand end 9, when plunger 26 is seated, washer 29 is slightly away from the end of cavity 23 and the outer end of plunger 26 is a like distance inside piston 10. A compression coil spring 30 is inserted between washers 29 holding plungers 26 in their outward position.

The upper piston 10 is shown at the center or midway in its stroke. Let us assume that the car is making a normal turn and that the present piston movement is toward the right. For convenience in referring to left and right, the planetary movement may be disregarded. Both plungers 26 will be in the outward position as at the right with the left one held in that position by spring tension. Although slight compression exists in the right cylinder 20, the tension of spring 30 is just sufficient to hold plunger 26 outward while the carrier differential fluid under compression escapes through hole 27, past seat 24, through hole 25, through the open side of horseshoe washer 29 into spring cavity 23.

Now let us assume that the car is standing, that one wheel has no traction and the car must be driven entirely by the other wheel. Also that the present piston movement is toward the left. The tractionless wheel has attained a speed such that piston movement is somewhat more rapid than when making a normal turn. Compression of the carrier fluid builds up faster than it can be relieved and plunger 26 is forced inward against the tension of spring 30. As the plunger 26 seats as shown at the left, the cylinder 20 is completely sealed and much power is required to drive the piston 10 farther. Of course the closing occurs near the beginning of the compression stroke instead of in the middle position shown, utilizing nearly the full length of the stroke.

The effect of this resistance to the rotary motion of the pinion gears 11 may be more readily understood by imagining an extreme and assuming that the pinion gears 11 are held rigidly. The effect would be identical to one solid axle keyed to both wheels. This differential resistor is a modification between that and the unresisted action of the conventional differential. It retains the equalization of power application to the two side gears 14 when the wheels have equal traction while it tends to equalize the speeds of the side gears 14 when the wheels have unequal traction. Obviously, we cannot have both power equality and speed equality to the fullest extent and it seems that a partial sacrifice of speed equality is much preferable. Although a wheel with poor traction cannot be prevented from turning considerably faster than the other, it cannot dig itself down in one place because the amount of power for driving the car by the other wheel is determined wholly by the degree of acceleration. This action would be excellent in deep snow and would greatly lessen the need for tire chains or snow treads.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. The combination with a vehicle differential having a rotary gear carrier and a pair of differential pinions carried thereby meshing with side gears on the axle shafts of the vehicle drive wheels, of a differential resistor reciprocally connected to each of said differential pinions within said carrier and interposed between said differential pinions and also between the side gears, said resistor freely permitting slow relative rotations of said pinions to each other and progressively resisting greater relative rotations of said pinions to each other and preventing free rotation of either pinion relative to the other, each said resistor comprising a double ended piston, a cylinder for each end of said piston within which the piston end extends, a passage connecting each cylinder to the differential fluid in said carrier when its piston end has withdrawn the maximum stroke therefrom, a passage through each piston outer end to the inner end thereof and to the differential fluid in said carrier, a valve plunger in each piston outer end for closing said passage to its inner end to the differential fluid, and means normally and yieldably resisting the closing operation of said valve plunger as said piston reciprocates in its cylinder to permit said valve plunger to close its passage as the relative rotational speed of said pinions increases and thereby limit the differential speeds of said pinions to each other to thus differentially limit the relative rotational speeds of the vehicle wheel shafts to each other.

2. The combination in claim 1 wherein each said piston has a central portion rectangular in cross-section, a channel extending transversely thereof on the pinion side thereof, and an eccentrically located cylindrical projection on the adjacent face of said pinion extending into said channel providing the reciprocating connection between said piston and said pinion.

3. The combination in claim 1 wherein each valve plunger has a bleed opening from the cylinder end thereof therethrough to its valve seat providing part of the passage, a guidepin extending from said valve plunger on its valve seat side through an opening of greater diameter than said guidepin in the inner end of said piston to the carrier fluid providing the remainder of said latter passage.

4. The combination in claim 2 wherein each valve plunger has a bleed opening from the cylinder end thereof therethrough to its valve seat providing part of the passage, a guidepin extending from said valve plunger on its valve seat side through an opening of greater diameter than said guidepin in the inner end of said piston to the carrier fluid providing the remainder of said latter passage, said central portion of said piston on the side away from its pinion and open to the carrier fluid, said guidepin openings extending into said cavity, said guidepin having its inner end within said cavity, said yieldable resisting means comprising a common coil spring biased between said guidepin inner ends, and means on said guidepin inner ends to abut the cavity wall and limit its outward movement under said spring.

5. The combination with a vehicle differential having a rotary gear carrier and a pair of differential pinions carried thereby meshing with side gears on the axle shafts of the vehicle drive wheels, of a differential resistor reciprocally connected to each of said differential pinions within said carrier and interposed between said differential pinions and also between the side gears, said resistor freely permitting slow relative rotations of said pinions to each other and progressively resisting greater relative rotations of said pinions to each other and preventing free rotation of either pinion relative to the other, each said resistor comprising a valved double ended piston including a yieldably operated valve therein, a cylinder for each end of said piston within which the piston end extends, a passage connecting each cylinder to the differential fluid in said carrier when its piston end has withdrawn the maximum stroke therefrom, a passage through each piston outer end to the inner end thereof and to the differential fluid in said carrier, said valved piston closing its passage as the relative rotational speed of said pinions increases and thereby limiting the differential speeds of said pinions to each other to thus differentially limit the relative rotational speeds of the vehicle wheel shafts to each other.

DE WITT C. CLINTSMAN.

References Cited in the file of this patent

UNITED STATES PATENTS

| Number | Name | Date |
| --- | --- | --- |
| 1,178,093 | Moon | Apr. 4, 1916 |
| 1,479,752 | Smith | Jan. 1, 1924 |
| 1,659,833 | Norrlin | Feb. 21, 1928 |
| 1,916,715 | Corey | July 4, 1933 |
| 2,375,938 | Moon | May 15, 1945 |
| 2,627,190 | Bottcher | Feb. 3, 1953 |